United States Patent [19]

Matsushima et al.

[11] Patent Number: 5,462,154
[45] Date of Patent: Oct. 31, 1995

[54] SLAT FOR TRANSPORTING DEVICE FOR EXTRUDED ARTICLES OF ALUMINUM OR ALUMINUM ALLOY

[75] Inventors: Kiyomitsu Matsushima; Hidekazu Odake; Tamotsu Ohashi; Isamu Tsukada, all of Toyama, Japan

[73] Assignee: Yoshida Kogyo K.K., Tokyo, Japan

[21] Appl. No.: 249,575

[22] Filed: May 26, 1994

[30]  Foreign Application Priority Data

Jun. 2, 1993 [JP] Japan ................................ 5-029404 U
Nov. 30, 1993 [JP] Japan ................................ 5-299610
Dec. 8, 1993 [JP] Japan ................................ 5-065603 U

[51] Int. Cl.⁶ ................................................ B65G 15/44
[52] U.S. Cl. ......................... 198/699; 198/822; 198/952; 432/239
[58] Field of Search ........................ 198/952, 822, 198/793, 803.01, 803.2, 795, 850, 699; 432/239, 240, 243, 244, 245, 261

[56] References Cited

U.S. PATENT DOCUMENTS 4,062,459 12/1977 Robertson ........................... 432/239 X
4,618,056 10/1986 Cutshall ............................. 432/239 X
4,903,824  2/1990 Takahashi ........................... 198/952 X

*Primary Examiner*—D. Glenn Dayoan
*Attorney, Agent, or Firm*—Finnegan, Henderson, Farabow, Garrett & Dunner

[57]  ABSTRACT

A slat for a transporting device for an extruded article of aluminum or an aluminum alloy in which only a worn-out portion of a heat-resistant member may be exchanged easily. The slat includes an elongated base member secured to the transporting device for the extruded article, subsidiary heat-resistant members removably mounted at terminal ends of the base member, and a main heat-resistant member arranged between the subsidiary heat-resistant members.

13 Claims, 10 Drawing Sheets

5,462,154

SLAT FOR TRANSPORTING DEVICE FOR EXTRUDED ARTICLES OF ALUMINUM OR ALUMINUM ALLOY

BACKGROUND OF THE INVENTION

1. Field of the Invention

This invention relates to a heat-resistant shock-absorbing slat for a transporting device for an extruded article of aluminum or an aluminum alloy from an extruder.

2. Description of the Prior Art

Heretofore, a device for transporting an extruded aluminum or aluminum alloy article 2 from an extruder 1 includes a row of a number of spaced unit conveyors 3, 4, 5, 6 and 7 at a runout of the extruder for transporting the article 2, as shown in FIG. 5, and a number of overlifts 11 placed between the unit conveyors for transferring the extruded article 2 and put across the unit conveyors onto a line of cooling tables 8, 9 and 10 arranged in a direction other than the direction of the unit conveyors 3 to 7, as shown in FIG. 6.

The extruded article 2 from the extruder 1 is run as it is supported on a heat-resistant shock-absorbing slat 13 (a transverse ledge supporting the article in order to prevent it from being grazed) mounted on a belt of each unit conveyor. When the trailing of the article 2 leaves an initial table 12 and its leading end travels on the ultimate conveyor 7, the extruded article 2 is transiently halted and transferred by the overlift 11 onto the row of cooling tables 8 to 10 so as to be transported in succession by these cooling tables. The article 2 is cooled in the interim by a fan or with atmospheric air between the unit conveyors and the cooling tables.

There has hitherto been known such a slat, the heat-resistant shock-absorbing material of which is formed of carbon. In this case, the carbon slat has both of its ends secured with four bolts to the transporting device, so that in exchanging the slat, these four bolts need to be dismounted, thus rendering maintenance operation laborious. There has also been known a slat formed of a heat-resistant felt exhibiting more excellent shock-absorbing properties (Japanese Utility Model Application Laid-Open No. 63-18941). However, the felt material is liable to wear, especially at its middle portion. Even if worn only partially, the felt material needs to be exchanged for quality upkeep of the extruded aluminum article, thus raising maintenance and cost problems. Although the slat has both ends mounted by retention members in the proposal of the above Japanese Application, transporting cannot be smoothly performed due to the force applied by the extruded article in its movement direction, if the retention members are mounted in such a manner that engagement and removal of the retention members may be easily performed. Conversely, if the slat is firmly secured by the retention members, the slat can not be exchanged easily.

Besides, the exchange operation needs to be performed at an optimum time for quality upkeep of the extruded article and with as little waste of the felt material as possible. Nevertheless, in consideration of costs, it is not practical to measure the amounts of wear caused to the felt material periodically and quantitatively in order to calculate the optimum exchange time accurately.

SUMMARY OF THE INVENTION

It is therefore an object of the present invention to provide a slat which facilitates an exchange operation, which is strongly secured with respect to the movement direction of the extruded article and which is capable of smoothly transporting the extruded article.

It is another object of the present invention to provide a slat in which only the portion thereof worn considerably may be easily exchanged in place of exchanging the slat in its entirety.

It is a further object of the present invention to provide a slat for a transporting device for an extruded article by which the optimum exchange timing can easily be discerned and which can be produced at lower cost, is superior in cushioning properties, capable of reducing the amount of wear, and is not susceptible to exfoliation of the heat-resistant felt material.

As a result of diligent research, the present inventor has found that, by dividing the heat-resistant shock-absorbing slat in plural portions and rendering only the mid portions liable to severe wear exchangeable, the above problem can be overcome. The present invention has been arrived at based upon this finding.

The present invention provides a slat for a transporting device for an extruded article of aluminum or an aluminum alloy comprising an elongated base member secured to the transporting device for the extruded article of aluminum or an aluminum alloy, subsidiary heat-resistant members removably mounted at terminal ends of the base member, and a main heat-resistant member arranged between the subsidiary heat-resistant members.

The present inventor has conducted diligent research into means whereby the exchange time of the slat can be recognized easily, and, as a result, it has been found that the above means may be achieved by constructing the heat-resistant felt material of a base cloth and a felt component and constructing the felt components by at least two layers having different ingredient mixing ratios instead of by a sole layer.

Thus, the present invention also provides a slat for a transporting device for an extruded article of aluminum or an aluminum alloy comprising a heat-resistant felt component on its surface, wherein the felt component has a basic cloth and a felt layer thereon, with the felt layer being made up of at least two layers each composed of mixed fibers of aromatic polyamide (hereinafter referred to as "aramide") fibers and carbon fibers, the fiber mixing ratio for the layers being changed to allow said layers to be distinguished by difference in color.

DETAILED DESCRIPTION OF PREFERRED EMBODIMENTS

The present invention is now explained in detail with reference to the drawings.

Figure 1:
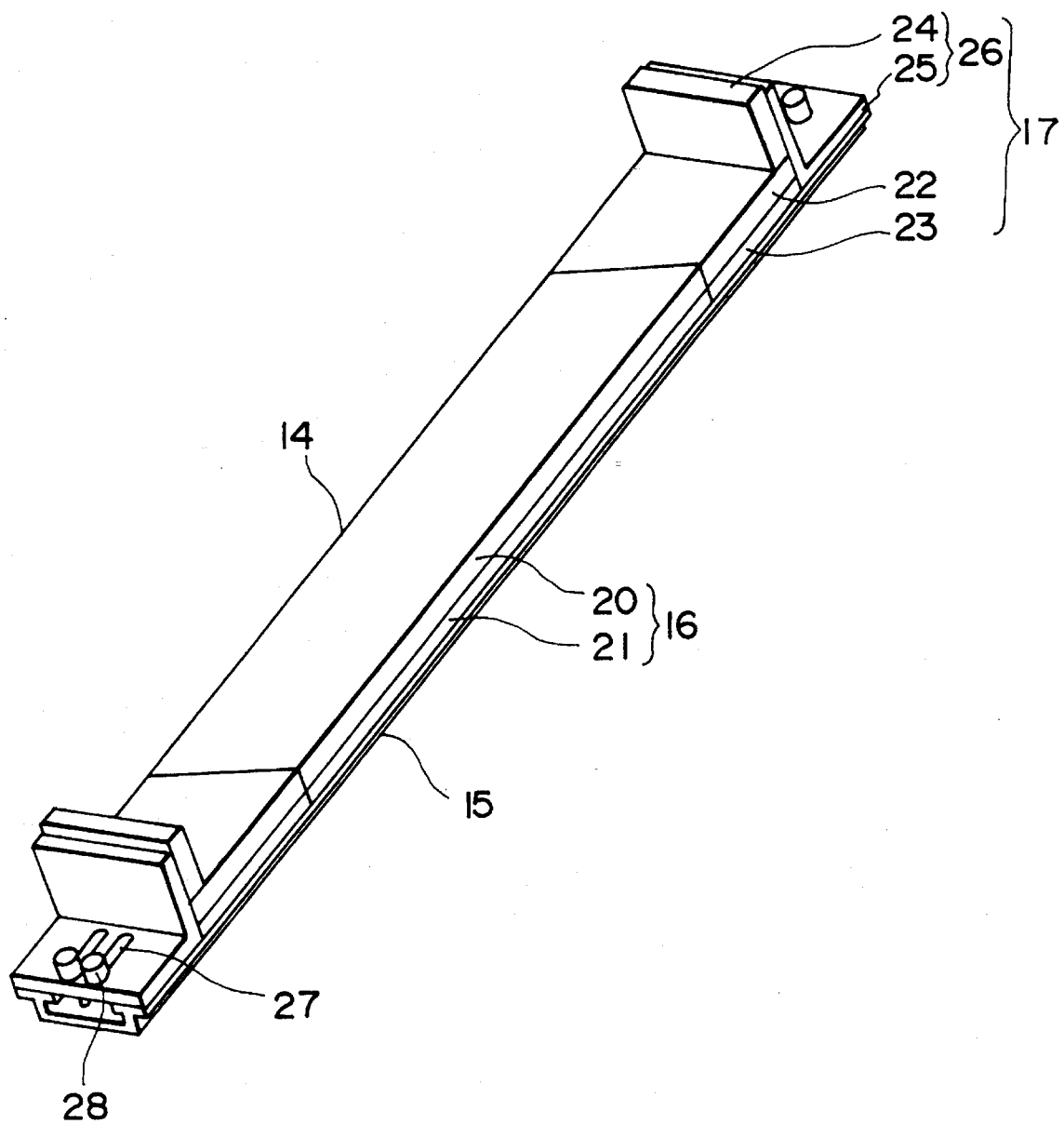
FIG. 1 is a perspective view showing a slat 14 according to an embodiment of the present invention.

A slat 14 is made up of a base member 15 mounted on a transporting device and a heat-resistant member held by the base member. According to the present invention, the heat-resistant member of the slat is divided into three portions, namely subsidiary heat resistant member 17 on both ends and a main heat-resistant member 16, as a shown in a perspective view of FIG. 1 showing the slat in its entirety. What is most important is that only the main heat-resistant member, which is most liable to wear, is adapted to be exchangeable. The subsidiary heat-resistant members 17 may also include a side member 26 having a side heat-resistant component 24 extending at right angles to the base member 15, if so desired. This side member 26 secures the main heat-resistant member and the subsidiary heat-resistant members 17, which are held on a subsidiary heat resistant component holder, and the main heat-resistant member 16, onto the base member 15. The extruded article may be guided satisfactorily by the side member 26. In this case, the side heat-resistant component 24 may be connected to the inner side of a vertical portion of an L-shaped side component 25, such as by adhesion, as shown in FIG. 1. However, if it is feared that the heat-resistant component 24 be peeled off due to abutment by the extruded article, a side heat-resistant component having a elliptical cylindrical shape may be used and mounted on the vertical portion of the side component 25. Alternatively, the side member 26 in its entirety may be constituted by a heat-resistant felt block. The above problem may be resolved by providing the side heat-resistant component in this manner. In addition, the subsidiary heat-resistant member 17 may have its one side secured to the base member, while having its opposite side removable, in order to permit the heat-resistant member to be exchanged only from one direction.

Figure 2:
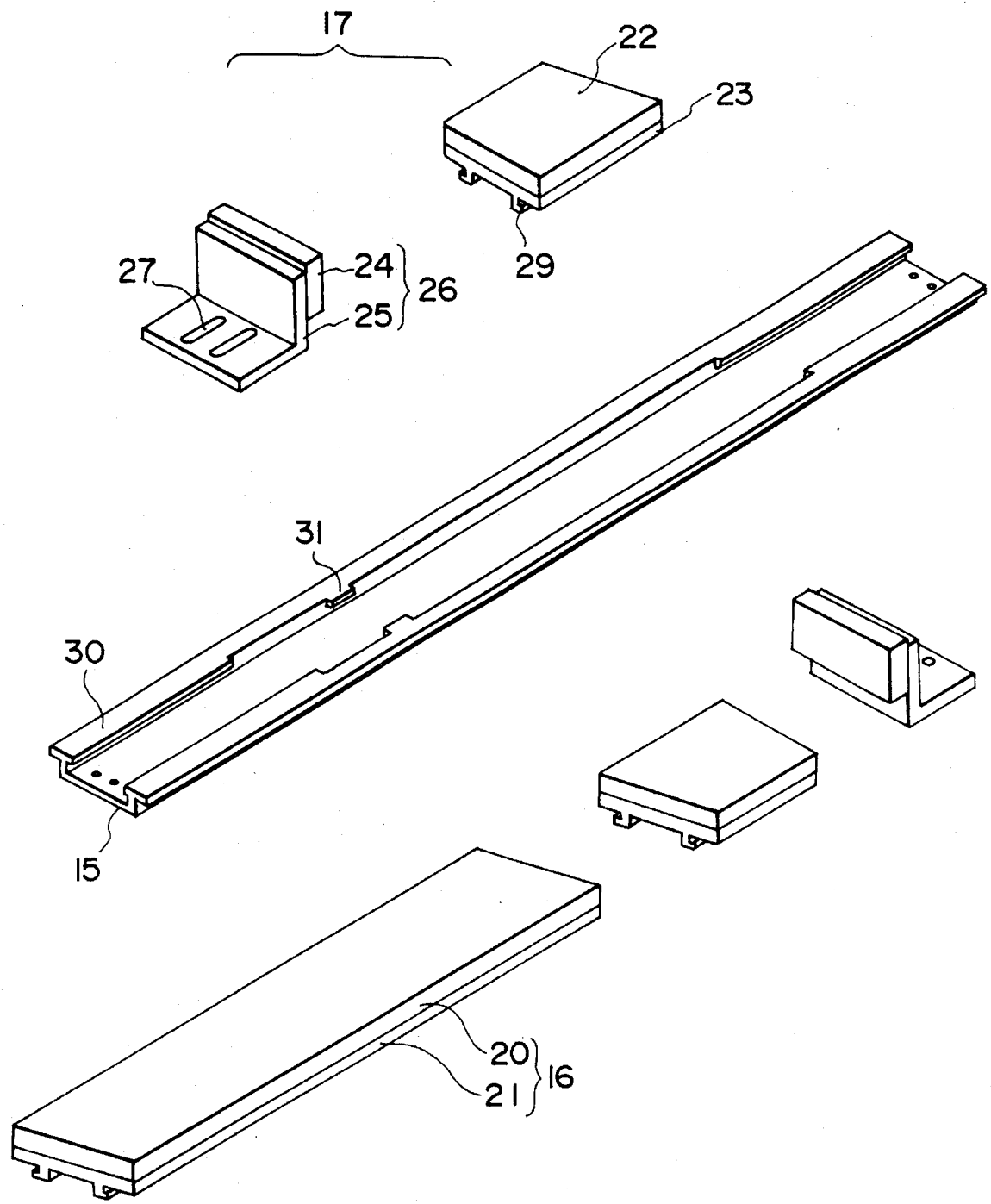
FIG. 2 is an exploded view of FIG. 1.

The heat-resistant member may be made up of heat-resistant components 20, 22 and heat-resistant holding member 21, 23 holding them, as shown in FIG. 2, which is an exploded view of FIG. 1. The heat-resistant holding members may be provided at the lower portions thereof with members engaged with the base member. Usually, the heat-resistant holding members may be formed of aluminum sections or wood, on which a heat-resistant felt member formed of heat-resistant fibers, such as aramide or carbon fibers or asbestos, are bonded, such as with an adhesive. However, in such case, if the felt member is worn out, it needs to be peeled off and replaced by a new felt member by a laborious operation. In order to overcome this deficiency, a metal section needed as the holding member may be replaced by a holding member comprised of heat-resistant fibers impregnated with epoxy resins and the foregoing felt member may be incorporated thereon to provide a disposable type heat-resistant member. The heat-resistant member may also be unified with a holding member, as in the case of a conventional carbon heat-resistant member. The heat-resistant holding member is preferably capable of withstanding the temperature on the order of 300° C., while the heat-resistant member is preferably capable of withstanding the temperature on the order of 400° to 500° C.

Although there is no limitation to means for securing each heat-resistant member to the base member, it is preferred to employ means permitting facilitated attachment or removal.

Most preferably, a guide member 30 is provided for engaging with and guiding a slide provided on the heat-resistant member and in the longitudinal direction of the base member, so that the heat-resistant member is slidable on the base member. In this member, the extruded article may be smoothly transported without being affected by the force exerted by the extruded article being transported. The central main heat-resistant member is positively secured to the base member by the subsidiary heat-resistant members secured to both ends of the base member by securing means such as bolts. The central portion, which needs to be exchanged frequently, may be exchanged easily only by dismounting one of the subsidiary heat-resistant members.

For further facilitating the exchange operation, the central main heat-resistant member may be exchanged by simply loosening the mounting bolts and slightly shifting the terminal subsidiary heat-resistant members outwards without dismounting the subsidiary terminal heat-resistant members from the base member. In this case, the main heat-resistant member is removably engaged with the base member and/or with the subsidiary heat-resistant members without being slidably engaged with the base member.

The division angle of the heat-resistant member is preferably at an inclined surface forming angle, rather than at a right angle, with respect to the long side of the base member. This angle is preferably on the order of 70° for the following reason. That is, if the angle is larger than 70°, the extruded article being transported tends to be fitted in a connecting portion of the main and subsidiary heat-resistant members, depending on the shape of the extruded article. On the other hand, if the angle is less than 70°, the subsidiary heat-resistant member is increased in size and leans against the mid portion susceptible to considerable wear, thus detracting from the effect of subdividing the heat-resistant member.

According to the present invention, only the central portion liable to wear may be exchangeable by subdividing the heat-resistant slat member, while the exchange operation may be facilitated.

EXAMPLE

Figure 3:
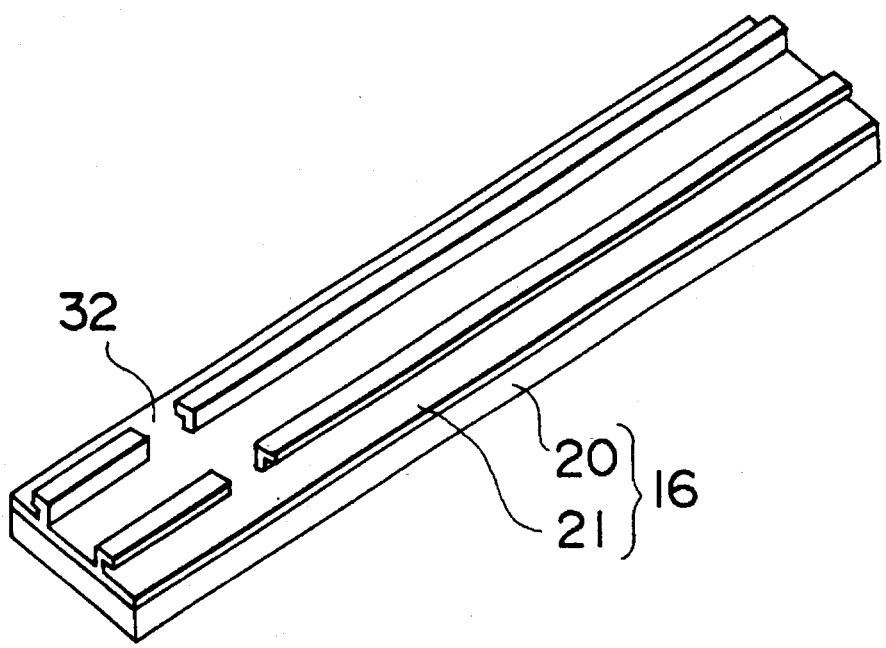
FIG. 3 is an explanatory view of a back surface of a main heat-resistant member 16 shown in FIG. 2.
Figure 4:
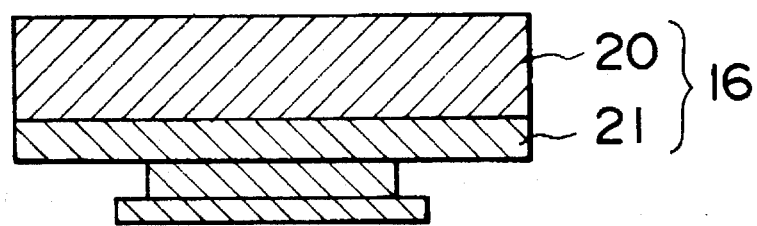
FIG. 4 is a cross-sectional view of the main heat-resistant member 16.
Figure 5:
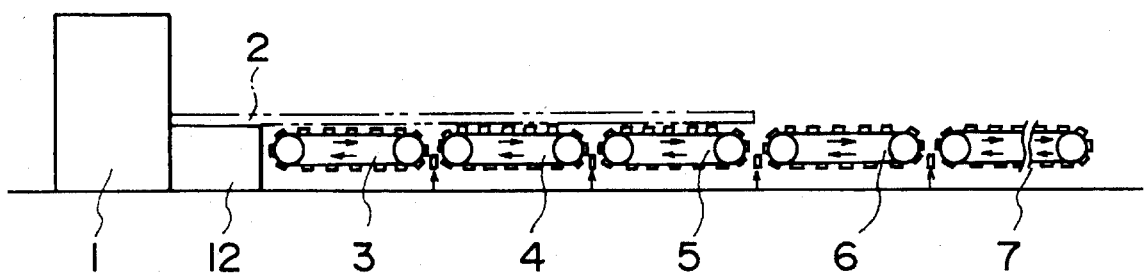
FIG. 5 is a side elevational view of a conventional transporting device.
Figure 6:
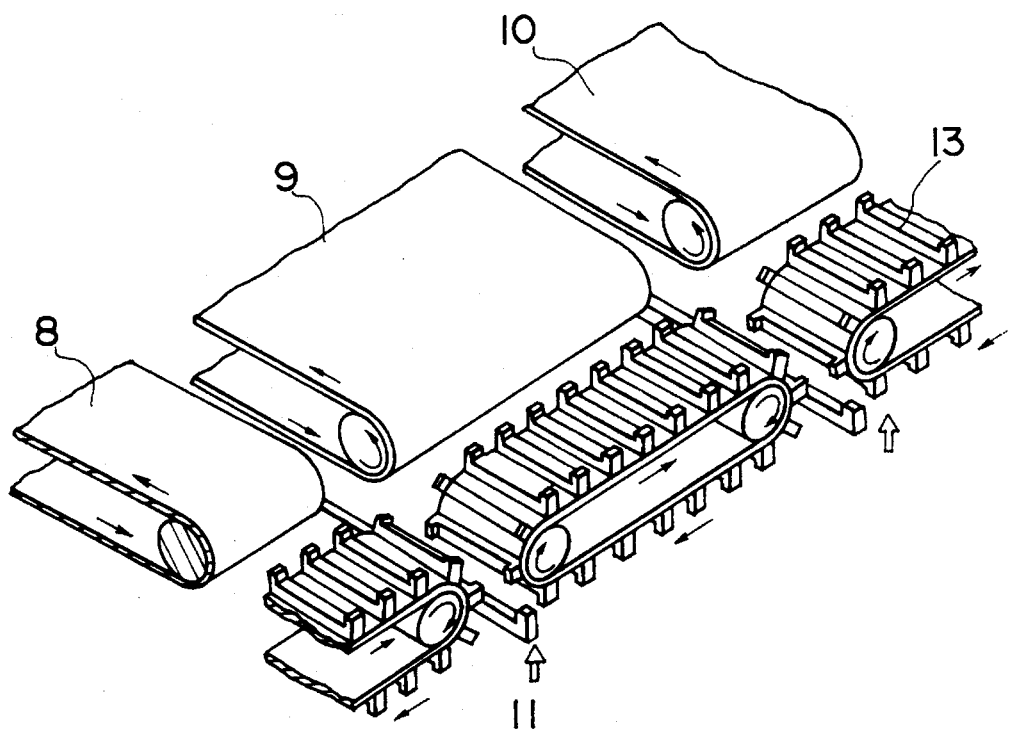
FIG. 6 is a perspective view thereof.

FIG. 1 is an overall perspective view of a slat according to an embodiment of the present invention, and FIG. 2 is an exploded view thereof. In the present embodiment, a subsidiary heat-resistant member 17 has a subsidiary heat-resistant component 22 on a subsidiary heat-resistant component holding member 23 and a side member 26 comprising a side heat-resistant component 24 and a side component 25. The subsidiary heat-resistant member 17 has a slide 29 engaged with and slidable on a guide 30 of the base member. The engagement between the slide 29 and the guide 30 may be provided on the entire longitudinal length of the base member. However, a catch 31 registering with a cut-out 32 on the back surface of the main heat-resistant member may be provided as shown in FIG. 3, without providing a guide at the portion of the base member registering with the main heat-resistant member, as shown in FIG. 2, so that the main heat-resistant member is positioned by the engagement of the catch with the cut-out and secured from both sides by the subsidiary heat-resistant members. In this case, when exchanging the central main heat-resistant member, which is most susceptible to wear, the main heat-resistant member may be exchanged easily by simply loosening bolts 28 and slightly shifting bolt slide holes 27 without dismounting the subsidiary heat-resistant members from the base member. In FIG. 4, the main heat-resistant member is shown in cross-section. FIGS. 1 to 3, the heat-resistant holding member is formed from an aluminum section. However, in FIG. 4, heat-resistant fibers impregnated with an epoxy resin is shaped as a plate which is machined to a pre-set shape and three of the plates are bonded together. Although three plates are bonded together in the embodiment illustrated, this is merely illustrative and integral molding may also be made.

Figure 7:
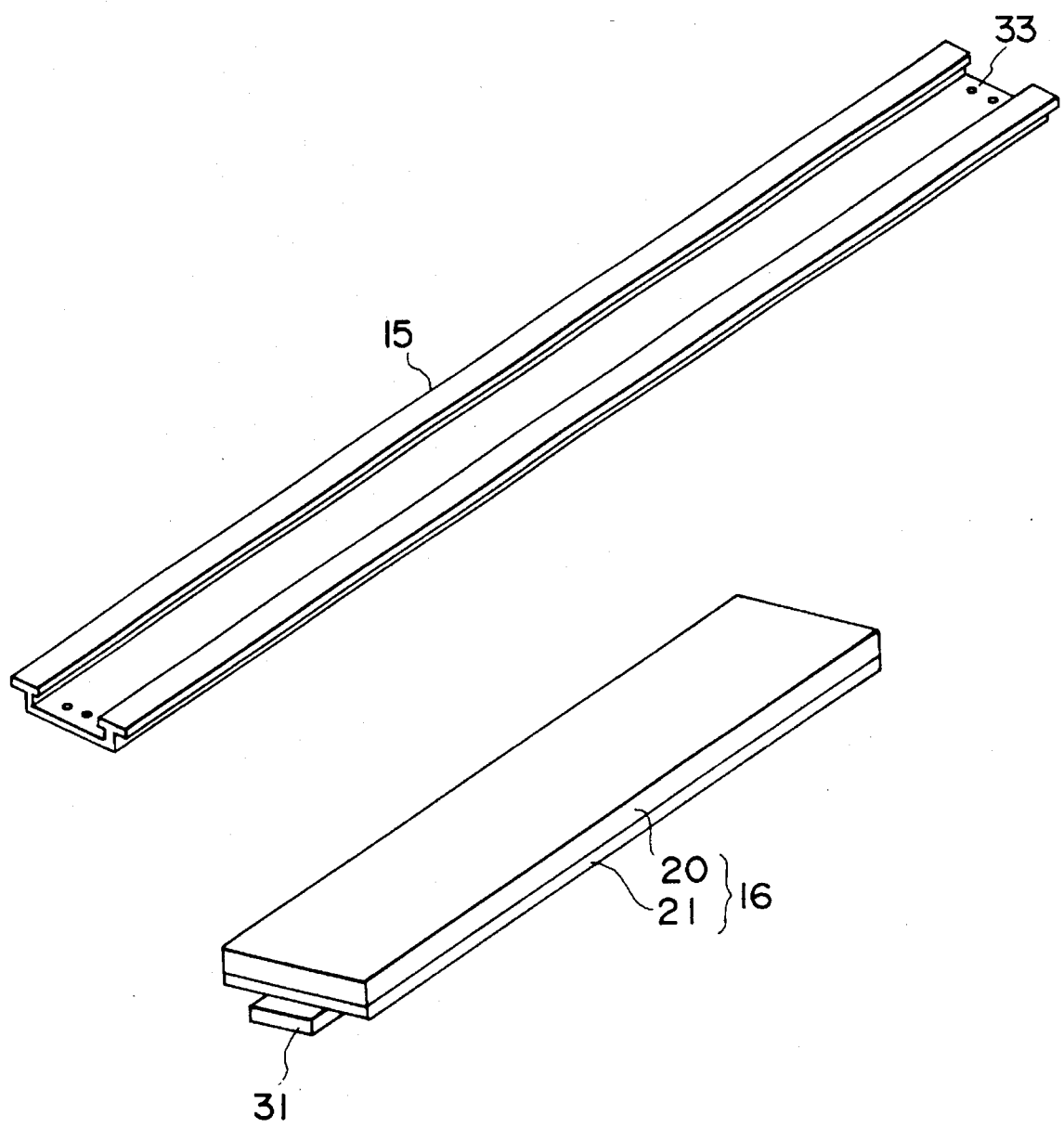
FIG. 7 is a perspective view of a base member 15 and the main heat-resistant member 16 showing another embodiment of the present invention.
Figure 8:
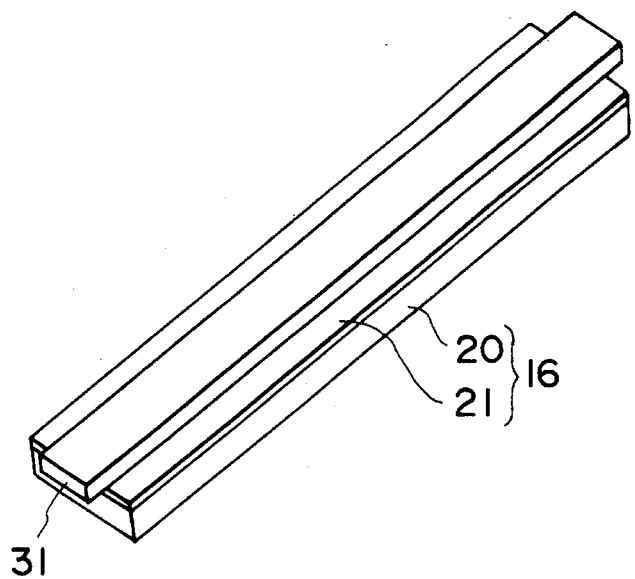
FIG. 8 is an explanatory view of the back surface of the main heat-resistant member 16.
Figure 9:
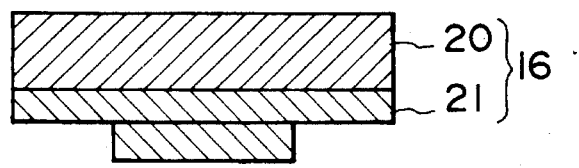
FIG. 9 is a cross-sectional view of the main heat-resistant member 16.

In FIG. 7 and in FIG. 8 showing the back surface of the main heat-resistant member shown in FIG. 7, a catch 31 is provided on the main heat-resistant member for being engaged with the back surface of the subsidiary heat-resistant member for achieving the positioning. In FIG. 7 reference numeral 33 indicate bolt holes for securing the base member to a transporting device and FIG. 9 is a sectional view of the main heat-resistant member.

Figure 10:
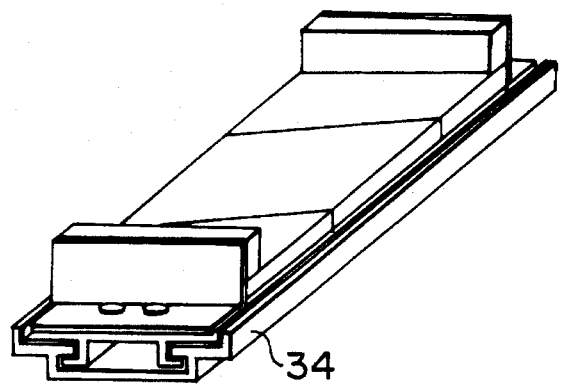
FIG. 10 is a perspective view showing a further embodiment of the present invention.

FIG. 10 shows, in perspective, a further embodiment of the present invention, wherein a rib 34 is provided on each side of the base member. The rib 34 provides for more accurate bonding of the heat-resistant component with respect to the heat-resistant holding member.

Figure 11:
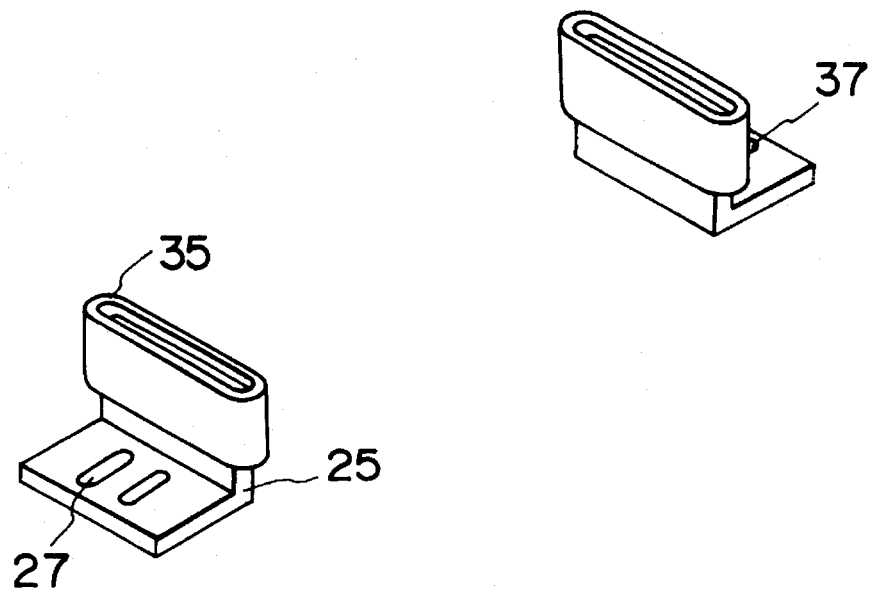
FIG. 11 is a perspective view showing a further embodiment of a side member of the present invention.
Figure 12:
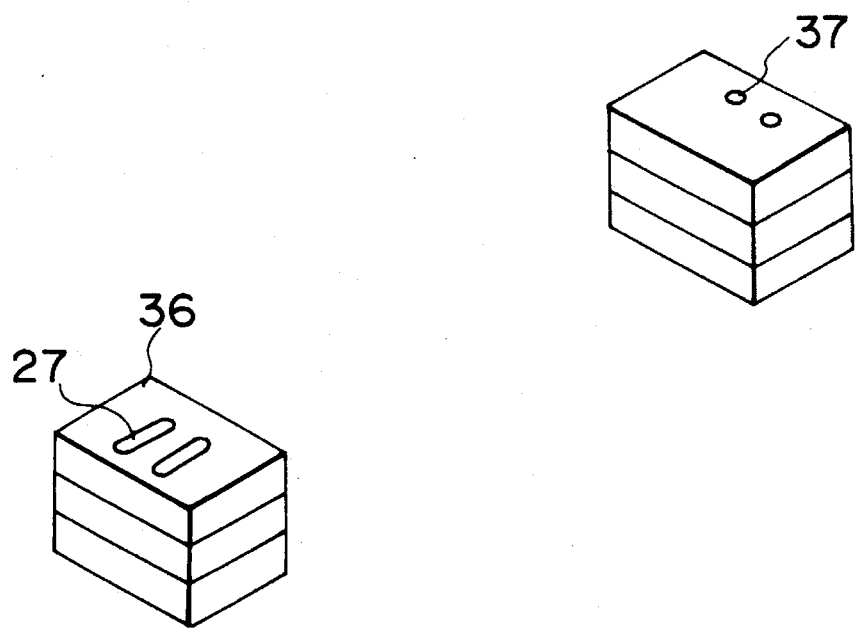
FIG. 12 is a perspective view showing a further embodiment of a side member according to the present invention.

FIGS. 11 and 12 show a modification of a side member constituting a part of the subsidiary heat-resistant member according to the present invention. In FIG. 11, a side heat-resistant component 35 molded to an elliptical shape is mounted on an upstanding portion of the L-shaped side component 25. In FIG. 12, a heat-resistant felt component is molded to a block which is used as a side member 36. If desired, the heat-resistant felt block may be reinforced by resin impregnation or may be of a suitable thickness by lamination. If the side member shown in FIGS. 11 or 12 is used, it becomes possible to prevent exfoliation of the heat-resistant felt due to abutment by the extruded article guided. In FIGS. 11 and 12, reference numeral 37 denotes bolt holes.

According to the present invention, as explained hereinabove, the heat-resistant member is divided into plural portions in order to permit exchange only of the central portion of the member, which is most liable to wear, thereby contributing to cost reduction. The exchange operation may be achieved simply by loosening the bolt and slightly shifting the terminal portions of the heat-resistant members without dismounting, thereby shortening the working time significantly.

Figure 13:
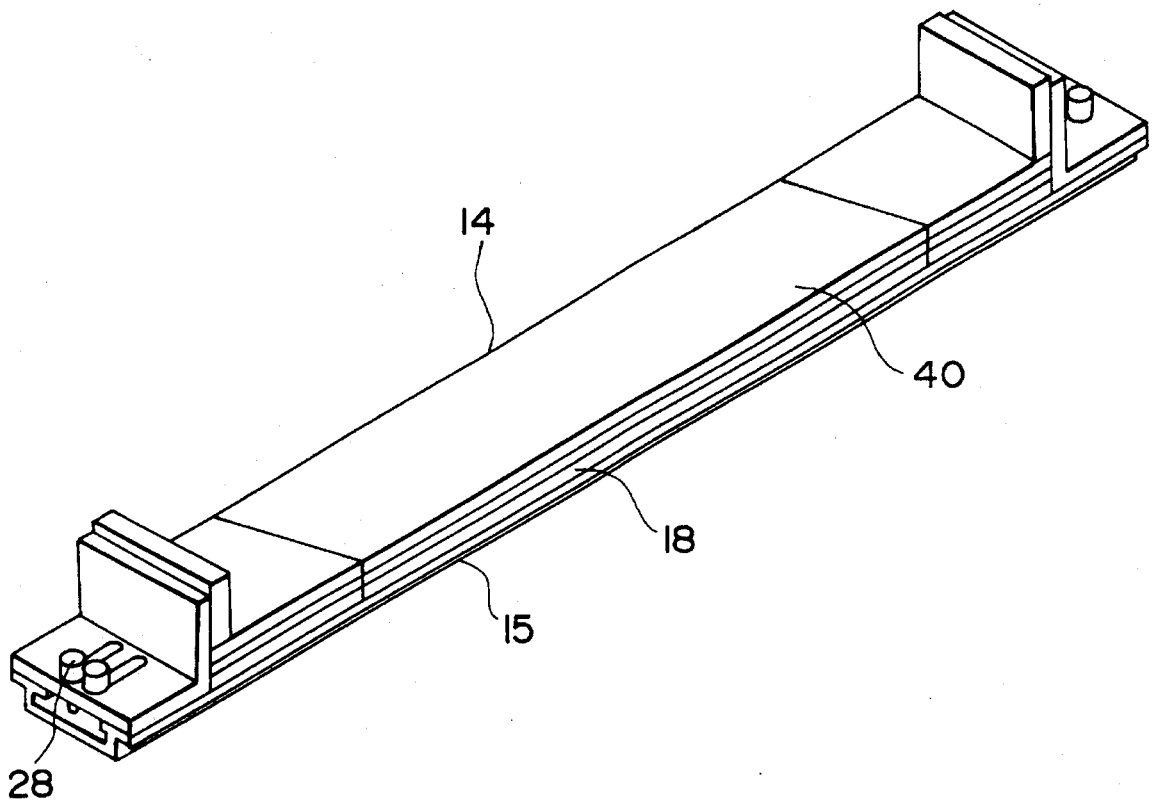
FIG. 13 is an overall perspective view of a slat 14 according to a further embodiment of the present invention.

The slat of the present invention, which is designed to permit the recognition of the optimum exchange time, is hereinafter explained. As shown in an overall perspective view of FIG. 13, a slat 14 is made up of a holding member 18 on the base member 15 mounted on the transporting device and a heat-resistant felt component 40 held on the holding member 18. This aspect of the present invention is characterized by the constitution of the heat-resistant felt component 40. What is important with the present slat 14 is that the heat-resistant felt component 40 comprises a base cloth 41 and a felt layer 42, and the felt layer 42 is made up of plural layers having different mixing ratios. Although the slat shown in FIG. 13 is divided to three parts so as to exchange only the central portion, which is most liable to wear of the heat-resistant felt component 40, the exchange time decision may be made for a unitary heat-resistant felt component as well.

The base cloth 41 employed in the present invention is a woven cloth or a non-woven cloth formed of heat-resistant fibers.

Figure 15:
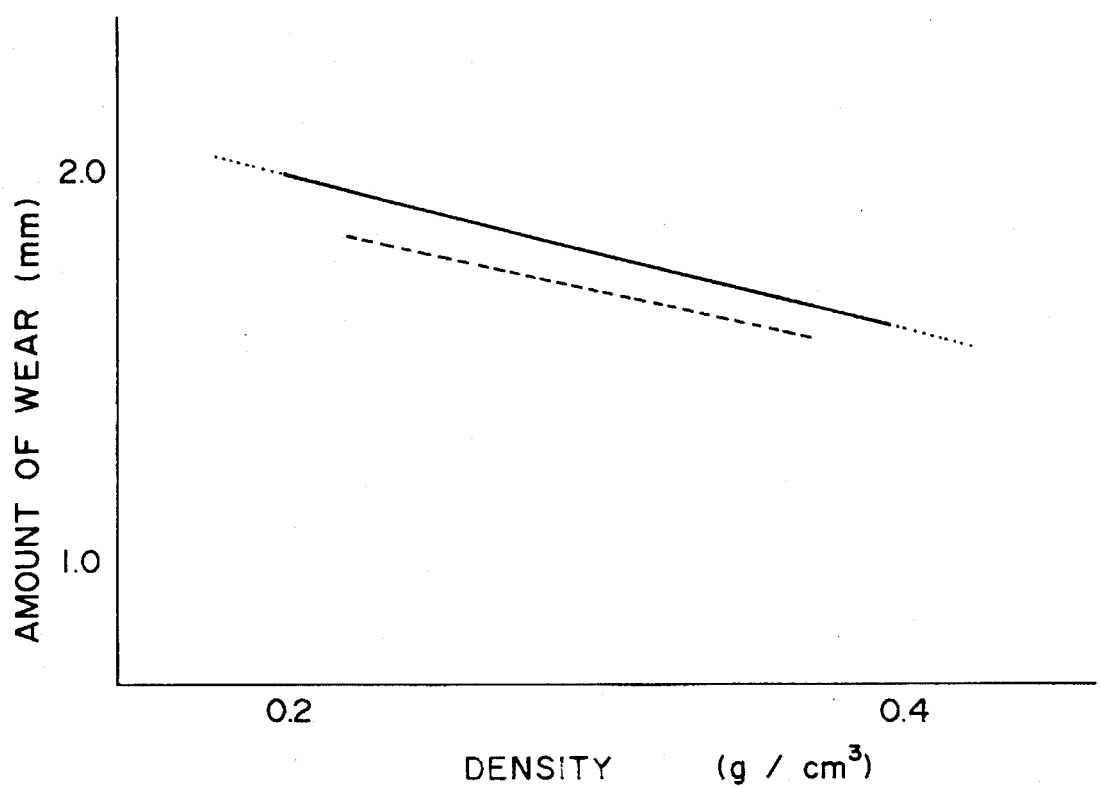
FIG. 15 is a graph showing the relation between the density and the wear of a mixture of 80% of aramide fibers and 20% of carbon fibers (upper solid line) and a 100% aramide fibers (lower dotted line).
Figure 16:
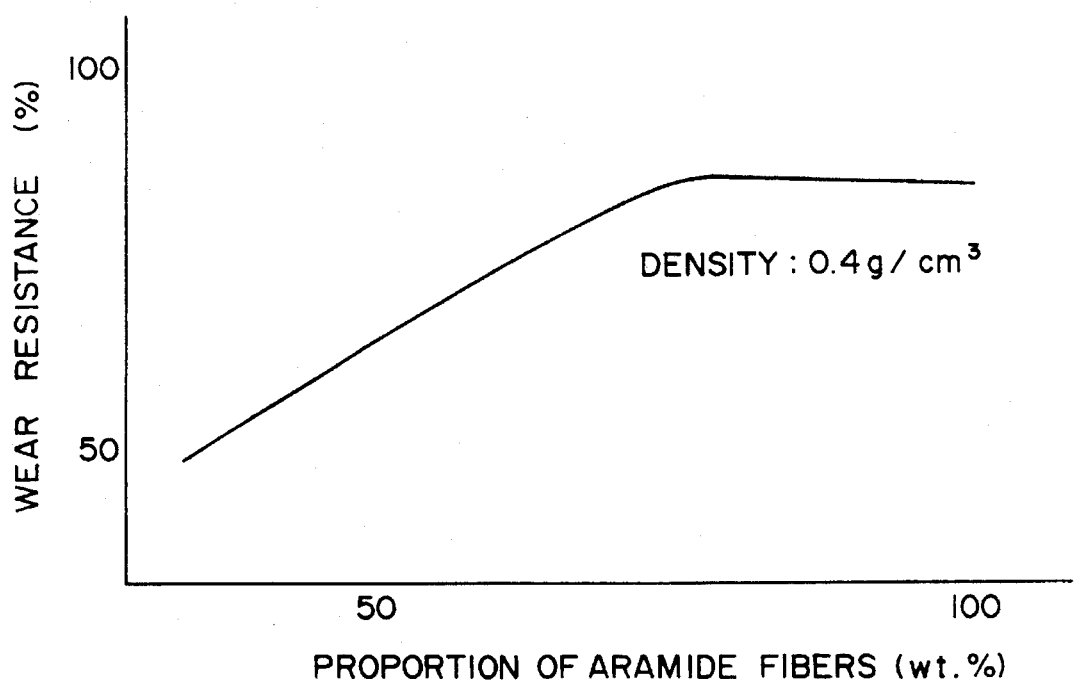
FIG. 16 is a graph showing the relation between the aramide fiber mixing ratio and wear resistance of a mixture of aramide fibers and carbon fibers.
Figure 17:
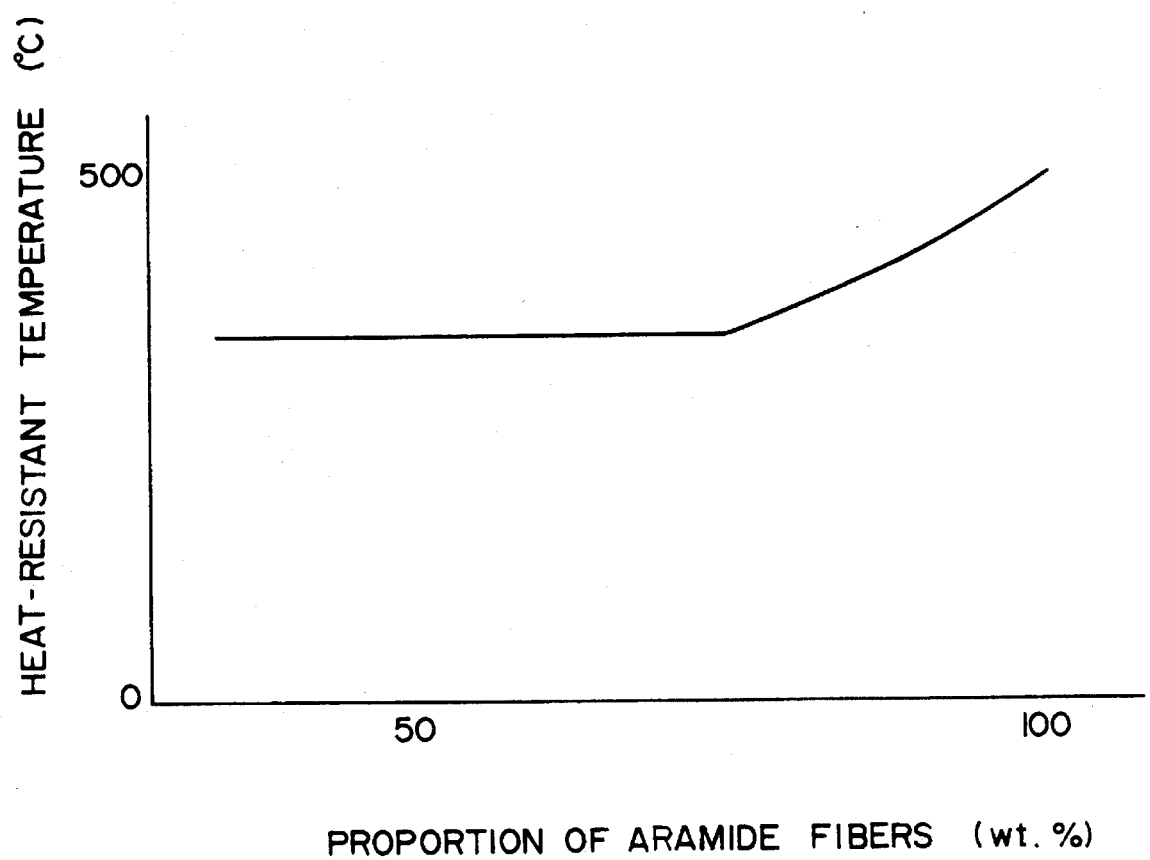
FIG. 17 is a graph showing the relation between the aramide fiber mixing ratio and the heat-resistant temperature in the mixed fibers of aramide fibers and carbon fibers.

The felt layer employed in the present invention is a woven or non-woven cloth made from mixed fibers of aramide and carbon fibers. Since the aramide fibers and the carbon fibers are yellowish and black in color, respectively, the felt layer differs in color depending on the mixing ratio of these fibers. Besides, the heat resistance and wear resistance properties of the felt layer is changeable depending on the mixing ratio. The higher the aramide fiber mixing ratio, the higher becomes the heat resistance (FIG. 17) with the wear resistance being maximum when the aramide fiber/carbon fiber mixing ratio is approximately 80:20 (FIG. 16). FIG. 15 shows the relation between the density and the amount of wear for the aramide-carbon fiber mixture with the mixing ratio of 80:20 (upper solid line) and a 100% aramide (lower dotted line).

With an eye to the above-described difference in physical properties, caused by the difference in the mixing ratio between the aramide fibers and the carbon fibers, the present invention enables the realization of optimization of the exchange time of the heat-resistant felt component by simple means, quality upkeep of the extruded material being transported, and wasteless effective utilization of the heat-resistant felt component of the slat. That is, the aramide fiber/carbon fiber mixing ratio is changed to such an extent that the color changes of the felt layer when the thickness of the heat-resistant felt layer reaches a thickness at which the heat-resistant felt has been become worn to a limit of use may be discerned on visual inspection and preferably this color change may be visually discerned from the cross-section of the felt layer. In such a manner, it becomes possible to optimize the exchange time of the heat-resistant felt component. As an upper heat-resistant felt layer 43 effectively used, it is preferred that the layer 43 contains aramide fibers, which are superior in heat-resistance and wear resistance, in a mixing proportion as a major ingredient. In other words, the upper layer of the heat-resistant felt component comprises 60 to 90% and preferably about 65 to 80% of aramide fibers, with the density being 0.3 to 0.5 $g/cm^3$ and preferably about 0.4 $g/cm^3$. Although the upper layer 43 is preferably a unitary layer, it may also be of two or more layers within the above mixing ratio.

The lower layer 44, which is exposed by wear to the upper layer 43, gives a warning that the limit of use of the heat-resistant felt layer has been reached, or is being approached. Since the lower layer 44 is not contacted directly or contacted only rarely with the extruded material, it may contain a smaller quantity of the aramide fibers having superior heat resistance, so that the heat-resistant felt component in its entirety may be decreased in cost. Specifically, the aramide fiber/carbon fiber mixing ratio by weight % is set to 10 to 40:90 to 60. Preferably, the mixing weight percentage of the aramide fibers is set to 25 to 35 wt. %. The lower layer 44 having such a mixing ratio may be of the same density as the upper layer. It is however preferred for the lower layer to have a lower value of density, such as 0.15 to 0.25 g/cm$^3$ and desirably about 0.2 g/cm$^3$. The lower layer is preferably of a sole layer, as is the upper layer. However, the lower layer may also be of two or more layers, if so desired. The upper layer/lower layer thickness ratio is 3 to 9:7 to 1 and preferably about 6:4.

Due to the different density between the upper and the lower layers and, above all, due to the lower density for the lower layer, the felt component of the present invention is improved in cushioning characteristics, thereby reducing the wear of the upper layer.

Although the heat-resistant felt component comprises the aramide fibers and the carbon fibers, other heat-resistant fibers may also be added to the mixture, if so desired.

The heat-resistant felt component is held by a holding member secured to a transporting device for the extruded article. For improving bounding between the holding member and the base cloth layer constituting the lowermost layer of the heat-resistant felt component, the base cloth layer bounded to the holding member with a double-sided tape or an adhesive may further be impregnated with resin in order that voids between the fibers of the base layer are filled with resin. In such a manner, the contact surface of the cloth layer with the holding member is densified and the exfoliation between the holding member and the felt component can be prevented.

Referring to the drawings, an embodiment of the slat of the present invention, which enables the optimum exchange time to be discerned easily, is explained.

Figure 14:
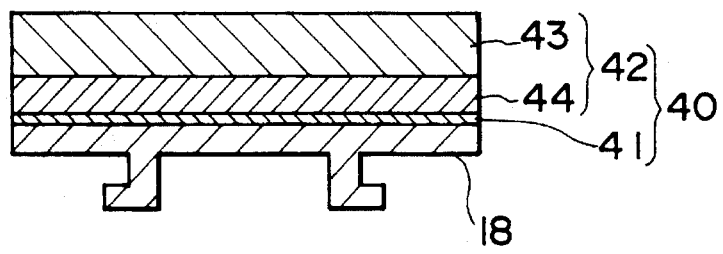
FIG. 14 is a cross-sectional explanatory view showing a layered construction of the slat shown in FIG. 13.

In FIG. 13, which is an overall perspective view of the slat, the heat-resistant felt component is divided into three portions in order that only a mid portion liable to the severest wear may be exchanged easily. FIG. 14 is a cross-sectional explanatory view for illustrating the layered structure shown in FIG. 13. In the present example, on upper layer 43 is formed of a material composed of 80% of aramide fibers and 20% of carbon fibers, with a density of 0.4 g/cm$^3$ and a thickness of 6 mm, while a lower layer 44 is formed of a material composed of 30% of aramide fibers and 70% of carbon fibers, with a density of 0.2 g/cm$^3$ and a thickness of 4 mm. As a base cloth 41, heat-resistant fibers were used, in which voids between the fibers of the base layer were charged with resin.

With the above-described slat of the present invention, the heat-resistance felt component is formed of plural layers, including at least two layers, namely an upper layer and lower layer, these layers being variable in color by varying the aramide fiber/carbon fiber mixing ratio for each layer so as to allow the degree of wear to be discerned visually. In this manner, the exchange time for the heat-resistant felt component may be optimized without the necessity of measuring the layer thickness, thereby rendering it possible to maintain the quality of the extruded article being transported and make effective and wasteless utilization of the heat-resistant felt component of the slat. In addition, by providing the multi-layered structure as described above, the lower layer may be lowered in its mixing ratio for more expensive aramide, thereby contributing to cost reduction of the slat for the transporting devise for the extruded article. Furthermore, since the lower layer may be formed of a material having a lower density, it becomes possible to improve cushioning properties of the heat-resistant felt component and reduce the wear of the upper layer as well as prevent exfoliation of the heat-resistant felt component.

What is claimed is:

1. A slat for a transporting device for an extruded article of aluminum or an alloy thereof, comprising an elongated base member having terminal ends and a guide secured to the transporting device, subsidiary heat-resistent members removably mounted at the terminal ends of said base member, and a main heat-resistant member arranged between said subsidiary heat-resistant members, wherein at least one of said subsidiary heat-resistant members is mounted to be slidable along the guide of said base member for removal of said main heat resistant member.

2. The slat as claimed in claim 1 wherein said main heat-resistant member is adapted for being engaged with said base member.

3. The slat as claimed in claim 1 wherein said subsidiary heat-resistant members comprise a subsidiary heat-resistant component held on a subsidiary heat-resistant component holding member, and a side member for securing said subsidiary heat-resistant component and said main heat-resistant member on said base member and for guiding said extruded article.

4. The slat as claimed in claim 3 wherein said side member comprises an L-shaped side component and a side heat-resistant component mounted on an upstanding portion of said L-shaped side component.

5. The slat as claimed in claim 4 wherein said side heat-resistant component is in an elliptical cylinder shape.

6. The slat as claimed in claim 3 wherein said side member is formed of a heat-resistant felt block.

7. The slat as claimed in claim 1 wherein said main heat-resistant member is adapted for being engaged with said subsidiary heat-resistant members.

8. The slat as claimed in claim 1, wherein said main heat resistant member is adapted for being engaged with both said base member and said subsidiary heat-resistant members.

9. A slat for a transporting device for an extruded article of aluminum or an alloy thereof, comprising a heat-resistant felt component on the surface thereof, said felt component having a base cloth and a felt layer thereon, said felt layer being made up of at least two layers each composed of mixed fibers of aramide fibers and carbon fibers, the fiber mixing ratio for said layers being changed to allow said layers to be distinguished by the difference in color.

10. A slat for a transporting device for an extruded article of aluminum or an alloy thereof, comprising:

an elongated base member having terminal ends secured to the transporting device;

subsidiary heat-resistant members removably mounted at the terminal ends of said base member, each said subsidiary heat resistant member including a subsidiary heat-resistant component held on a subsidiary heat-resistant component holding member, and a side member for securing said subsidiary heat-resistant component and said main heat-resistant member on said base member and for guiding an article, said side member including an L-shaped side component and an elliptical cylinder-shaped side heat-resistant component mounted on an upstanding portion of said L-shaped side component; and a main heat-resistant member arranged between said subsidiary heat-resistant members.

11. A slat for a transporting device for an extruded article of aluminum or an alloy thereof, comprising:

an elongated base member having terminal ends secured to the transporting device;

subsidiary heat-resistant members removably mounted at the terminal ends of said base member, each said subsidiary heat-resistant member including a subsidiary heat-resistant component held on a subsidiary heat-resistant component holding member, and a side member for securing said subsidiary heat-resistant component and said main heat-resistant member on said base member and for guiding an article, said side member being formed of a heat-resistant felt block; and a main heat-resistant member arranged between said subsidiary heat-resistant members.

12. A slat for a transporting device for an extruded article of aluminum or an alloy thereof comprising:

an elongated base member fixed to the transporting device having two ends and a pair of guides;

a main member having a projecting portion slidably inserted between the guides; and a pair of subsidiary members removably mounted at either end of said base.

13. The slat as claimed in claim 12, wherein at least one of said subsidiary members is mounted to said base member so as to be slidable along the guides.

* * * * *

UNITED STATES PATENT AND TRADEMARK OFFICE
CERTIFICATE OF CORRECTION

PATENT NO. : 5,462,154
DATED : October 31, 1995
INVENTOR(S) : Kiyomitsu MATSUSHIMA et al It is certified that error appears in the above-indentified patent and that said Letters Patent is hereby corrected as shown below:

Claim 1, Column 8, Line 9, "heat-resistent" should read --heat-resistant-;

Claim 8, Column 8, Lines 37-38, "heat resistant" should read --heat-resistant--;

Claim 10, Column 8, Line 55, "heat resistant" should read --heat-resistant--;

\* Claim 11, Column 9, Lines 9-10, "conponent" should read --component--.

Signed and Sealed this

Thirteenth Day of August, 1996

Attest:

BRUCE LEHMAN

Attesting Officer

Commissioner of Patents and Trademarks